(12) United States Patent
Vannatter et al.

(10) Patent No.: US 8,549,512 B1
(45) Date of Patent: Oct. 1, 2013

(54) SELF-SERVICE TERMINAL FIRMWARE VISIBILITY

(75) Inventors: Timothy B. Vannatter, Charlotte, NC (US); Richard L. Fitzgerald, Davidson, NC (US); Stephen R. Crowley, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 987 days.

(21) Appl. No.: 12/484,487

(22) Filed: Jun. 15, 2009

Related U.S. Application Data

(60) Provisional application No. 61/174,321, filed on Apr. 30, 2009.

(51) Int. Cl.
*G06F 9/44* (2006.01)
(52) U.S. Cl.
USPC .......................................... 717/171; 717/168
(58) Field of Classification Search
None
See application file for complete search history.

(56) References Cited

U.S. PATENT DOCUMENTS

| | | |
|---|---|---|
| 4,650,977 A | 3/1987 | Couch |
| 4,931,963 A | 6/1990 | Kimura et al. |
| 5,214,652 A | 5/1993 | Sutton |
| 5,386,104 A | 1/1995 | Sime |
| 5,550,816 A | 8/1996 | Hardwick et al. |
| 5,619,644 A | 4/1997 | Crockett et al. |
| 5,805,798 A | 9/1998 | Kearns et al. |
| 5,917,168 A | 6/1999 | Nakamura et al. |
| 5,964,831 A | 10/1999 | Kearns et al. |
| 5,984,178 A | 11/1999 | Gill et al. |
| 5,999,908 A | 12/1999 | Abelow |
| 6,263,497 B1 * | 7/2001 | Maeda et al. .............. 717/170 |
| 6,405,329 B1 | 6/2002 | Colligan et al. |
| 6,437,692 B1 | 8/2002 | Petite et al. |
| 6,539,570 B2 | 4/2003 | Youn et al. |

(Continued)

FOREIGN PATENT DOCUMENTS

| | | |
|---|---|---|
| EP | 961246 | 10/2008 |
| EP | 2088564 | 8/2009 |
| WO | WO 2001/351900 | 5/2001 |
| WO | WO 2004/044800 | 5/2004 |

OTHER PUBLICATIONS

"NCR's Gasper Exchange enhances ATM management" (www.atm-marketplace.com/article/131255/NCR-s-Gasper-Exchange-ATM-management), Networld Alliance, Louisville, KY, Dec. 18, 2006.

(Continued)

*Primary Examiner* — Elias Mamo
(74) *Attorney, Agent, or Firm* — Weiss & Arons LLP; Michael Springs

(57) ABSTRACT

A server that remotely monitors an Automated Teller Machine ("ATM") is provided. The server includes a memory module for maintaining information including identification of software applications resident on the self-service device, identification of firmware applications resident on the self-service device, and identification of the hardware resident on the self-service device. The server also includes a communications module for receiving updates of the identification of software applications resident on the self-service device, updates of the identification of firmware applications resident on the self-service device, and updates of identification of the hardware resident on the self-service device. The server may also include a processing module for storing in the memory module the updates of the identification of software applications resident on the self-service device, the updates of identification of firmware applications resident on the self-service device, and the updates of identification of the hardware resident on the self-service device.

18 Claims, 12 Drawing Sheets

(56) References Cited

U.S. PATENT DOCUMENTS

| | | |
|---|---|---|
| 6,574,686 B1 | 6/2003 | Sha et al. |
| 6,654,709 B2 | 11/2003 | Aoshika et al. |
| 6,687,714 B1 | 2/2004 | Kogen et al. |
| 6,711,612 B1 | 3/2004 | Blumenau et al. |
| 6,813,634 B1 | 11/2004 | Ahmed |
| 6,834,305 B1 | 12/2004 | Haynes et al. |
| 6,847,994 B1 | 1/2005 | Akimoto et al. |
| 6,880,003 B2 | 4/2005 | Greenwood |
| 6,896,179 B2 | 5/2005 | Satoh et al. |
| 6,917,594 B2 | 7/2005 | Feuerstraeter et al. |
| 6,953,150 B2 | 10/2005 | Shepley et al. |
| 6,976,622 B1 | 12/2005 | Trelawney et al. |
| 7,053,767 B2 | 5/2006 | Petite et al. |
| 7,151,780 B1 * | 12/2006 | Belscher et al. ............ 370/466 |
| 7,163,144 B1 | 1/2007 | Trelawney et al. |
| 7,177,839 B1 | 2/2007 | Claxton et al. |
| 7,232,063 B2 | 6/2007 | Fandel et al. |
| 7,293,201 B2 | 11/2007 | Ansari |
| 7,295,993 B1 | 11/2007 | Meek et al. |
| 7,328,376 B2 | 2/2008 | McGuire et al. |
| 7,334,723 B2 | 2/2008 | Shepley et al. |
| 7,380,125 B2 | 5/2008 | Di Luoffo et al. |
| 7,401,264 B1 | 7/2008 | Gill et al. |
| 7,406,035 B2 | 7/2008 | Harvey et al. |
| 7,406,630 B1 | 7/2008 | Gill et al. |
| 7,484,134 B2 | 1/2009 | Wolf et al. |
| 7,522,916 B2 | 4/2009 | Grossi et al. |
| 7,599,859 B2 | 10/2009 | Fulton et al. |
| 7,600,671 B2 | 10/2009 | Forrest et al. |
| 7,606,767 B1 | 10/2009 | Couper et al. |
| 7,620,948 B1 * | 11/2009 | Rowe et al. ............ 717/171 |
| 7,641,107 B1 | 1/2010 | Gill et al. |
| 7,647,325 B2 * | 1/2010 | Papatla et al. ......... 707/999.01 |
| 7,664,697 B2 | 2/2010 | Takayama |
| 7,677,447 B2 * | 3/2010 | MacPhail et al. ........... 235/380 |
| 7,681,089 B2 | 3/2010 | Ashmore |
| 7,702,773 B2 | 4/2010 | Lopez |
| 7,717,327 B2 | 5/2010 | Gomes |
| 7,738,123 B2 | 6/2010 | Burgoyne et al. |
| 7,757,940 B2 | 7/2010 | Sawa |
| 7,774,649 B2 | 8/2010 | Neilan |
| 7,778,937 B2 | 8/2010 | Ferrara et al. |
| 7,792,045 B1 | 9/2010 | Vijendra |
| 7,796,528 B2 | 9/2010 | Yoshizawa |
| 7,860,016 B1 | 12/2010 | Vijendra et al. |
| 7,861,120 B2 | 12/2010 | Cui |
| 7,873,726 B2 | 1/2011 | Ofir et al. |
| 7,908,525 B2 | 3/2011 | Fujishita |
| 7,921,420 B2 * | 4/2011 | Ferlitsch .................. 717/170 |
| 7,926,712 B2 | 4/2011 | Schlabach et al. |
| 7,934,006 B2 | 4/2011 | Kato et al. |
| 7,937,460 B2 | 5/2011 | Vaught |
| 8,255,698 B2 | 8/2012 | Li et al. |
| 2002/0029350 A1 | 3/2002 | Cooper et al. |
| 2002/0065775 A1 | 5/2002 | Monaghan |
| 2002/0091972 A1 | 7/2002 | Harris et al. |
| 2002/0095480 A1 | 7/2002 | Drummond et al. |
| 2002/0125998 A1 | 9/2002 | Petite et al. |
| 2003/0040959 A1 | 2/2003 | Fei et al. |
| 2003/0110248 A1 | 6/2003 | Ritche |
| 2003/0163388 A1 | 8/2003 | Beane |
| 2004/0003266 A1 * | 1/2004 | Moshir et al. ............. 713/191 |
| 2004/0044693 A1 * | 3/2004 | Hadley et al. ............. 707/200 |
| 2004/0050927 A1 | 3/2004 | Nozaki et al. |
| 2004/0073843 A1 | 4/2004 | Dean et al. |
| 2004/0225927 A1 | 11/2004 | Warpenburg et al. |
| 2005/0066019 A1 * | 3/2005 | Egan et al. ................ 709/223 |
| 2005/0096810 A1 | 5/2005 | Mahoney et al. |
| 2005/0151987 A1 | 7/2005 | Kawaura et al. |
| 2006/0048017 A1 | 3/2006 | Anerousis et al. |
| 2006/0181406 A1 | 8/2006 | Petite et al. |
| 2006/0242389 A1 | 10/2006 | Browning et al. |
| 2007/0214215 A1 * | 9/2007 | McCaleb et al. ........... 709/203 |
| 2008/0040543 A1 | 2/2008 | Yamazaki et al. |
| 2008/0116254 A1 | 5/2008 | Sleeman |
| 2008/0121692 A1 | 5/2008 | MacPhail et al. |
| 2009/0037284 A1 | 2/2009 | Lewis et al. |
| 2009/0057395 A1 | 3/2009 | He et al. |
| 2009/0058535 A1 | 3/2009 | Wilson |
| 2009/0081989 A1 | 3/2009 | Wuhrer |
| 2009/0161580 A1 | 6/2009 | Forsyth |
| 2009/0199044 A1 | 8/2009 | Hurrell |
| 2009/0199050 A1 | 8/2009 | Neilan |
| 2009/0199053 A1 | 8/2009 | Neilan et al. |
| 2009/0204856 A1 | 8/2009 | Sinclair et al. |
| 2009/0204858 A1 | 8/2009 | Kawaba |
| 2010/0042744 A1 | 2/2010 | Rahman et al. |
| 2010/0082933 A1 * | 4/2010 | Fleming et al. ............. 711/170 |
| 2010/0115583 A1 | 5/2010 | Delia et al. |
| 2010/0161343 A1 | 6/2010 | Kennedy et al. |
| 2010/0162030 A1 | 6/2010 | Schindel, Jr. et al. |
| 2010/0162050 A1 | 6/2010 | Cathro |

OTHER PUBLICATIONS

"Self-Serviced Car Wash" (http://forum.adamcommunity.com/viewthread.php?tid=154), ADAM Forum, May 18, 2008.

ADAM Forum; Open eAutomation, Boundless Integration; May 18, 2006; by Shankoo; @ http://forum.adamcommunity.com/viewthread.php?tid=154); 2 pages.

http://www.ncr.com/documents/aptra_advance_ndc_uk_ds.pdf retrieved on Feb. 1, 2010.

http://www.gasper-corp.com/Solution_Exchange.asp retrieved on Feb. 1, 2010.

http://www.aciworldwide.com/igsbase/igstemplate.cfm/SRC=MD021/SRCN=lookupdetails/GnavID=103/SnavID=/TnavID=/LookupCatID=30/CATsearch=1 Retreived on Feb. 1, 2010.

European Search Report for Application No. GB1007102.5.

"Patch (computing)" (http://en.wikipedia.org/w/index.php?title=Patch_(computing)&oldid=284067392), Wikipedia.org, Wikimedia Foundation, Inc. (registrant), Apr. 15, 2009, San Francisco, California.

* cited by examiner

SELF-SERVICE TERMINAL FIRMWARE VISIBILITY

CROSS-REFERENCE TO RELATED APPLICATION

This application claims priority from U.S. Provisional Patent Application No. 61/174,321, filed Apr. 30, 2009, entitled "End-To-End Self-Service Device Management," which is incorporated by reference herein in its entirety.

FIELD OF TECHNOLOGY

Aspects of the disclosure relate to providing apparatus and methods for improving self-service devices such as Automatic Teller Machines ("ATMs"), cash recyclers, and self-service kiosks. The aspects of the disclosure also relate to management of such self-service devices.

BACKGROUND OF THE INVENTION

One aspect of self-service terminals that is often overlooked is the ability of the terminal to be managed remotely. Today there are several companies involved in electronic self-service device management. Specifically, these companies focus on personal computer management. However, they typically do not have the ability to interact with peripherals that are unique to the self-service industry.

Due to the lack of remote capabilities, self-service device companies typically have to dispatch a technician to resolve device failures.

Several companies have developed software products to help manage PC devices, but these products may not be adapted to interface-well or, perhaps, at all-with peripherals on a self-service device such as a cash dispenser, depository, card reader, etc.

Other conventional products also typically do not combine PC management with management of self-service devices.

While self-service devices and self-service device monitoring solutions are available, these device solutions provide little information to the technician going on site to resolve self-service device failures. Recently some progress has been made in this area with the introduction of component level monitoring provided through Simple Network Management Protocol ("SNMP"). This feature allows for sensor level reporting of a failure. It would be desirable to provide more diagnostic details to assist the technician in problem determination.

Furthermore, current devices and device monitoring systems are typically reaction-based. Generally, such systems initiate a fault analysis only when a self-service terminal generates a fault that indicates a hard down failure—i.e., a failure that interrupts device service. When a hard fault indication is received, the monitoring system dispatches a technician to repair the self-service terminal. Because travel time accounts for a large percentage of downtime for self-service terminals, it would be desirable to eliminate, when possible, downtime for self-service terminals attributable to travel time. Specifically, it would be desirable to provide a self-service device that, preferably together with a remote monitoring system, can predict imminent failure and dispatch a technician to repair the device prior to the device going out of service—thereby eliminating the downtime associated with technician travel time.

It would also be desirable, in general, to provide apparatus and methods for providing end-to-end self-service device management.

SUMMARY OF THE INVENTION

A method for remotely monitoring an Automated Teller Machine ("ATM") is provided. The method may include maintaining information in a remote database. The information may include identification of software applications resident on the self-service device, identification of firmware applications resident on the self-service device, and identification of the hardware resident on the self-service device. The method may also include receiving updates of the identification of software applications resident on the self-service device, updates of the identification of firmware applications resident on the self-service device, and updates of identification of the hardware resident on the self-service device. The method may also include storing in memory the updates of the identification of software applications resident on the self-service device, the updates of identification of firmware applications resident on the self-service device, and the updates of identification of the hardware resident on the self-service device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
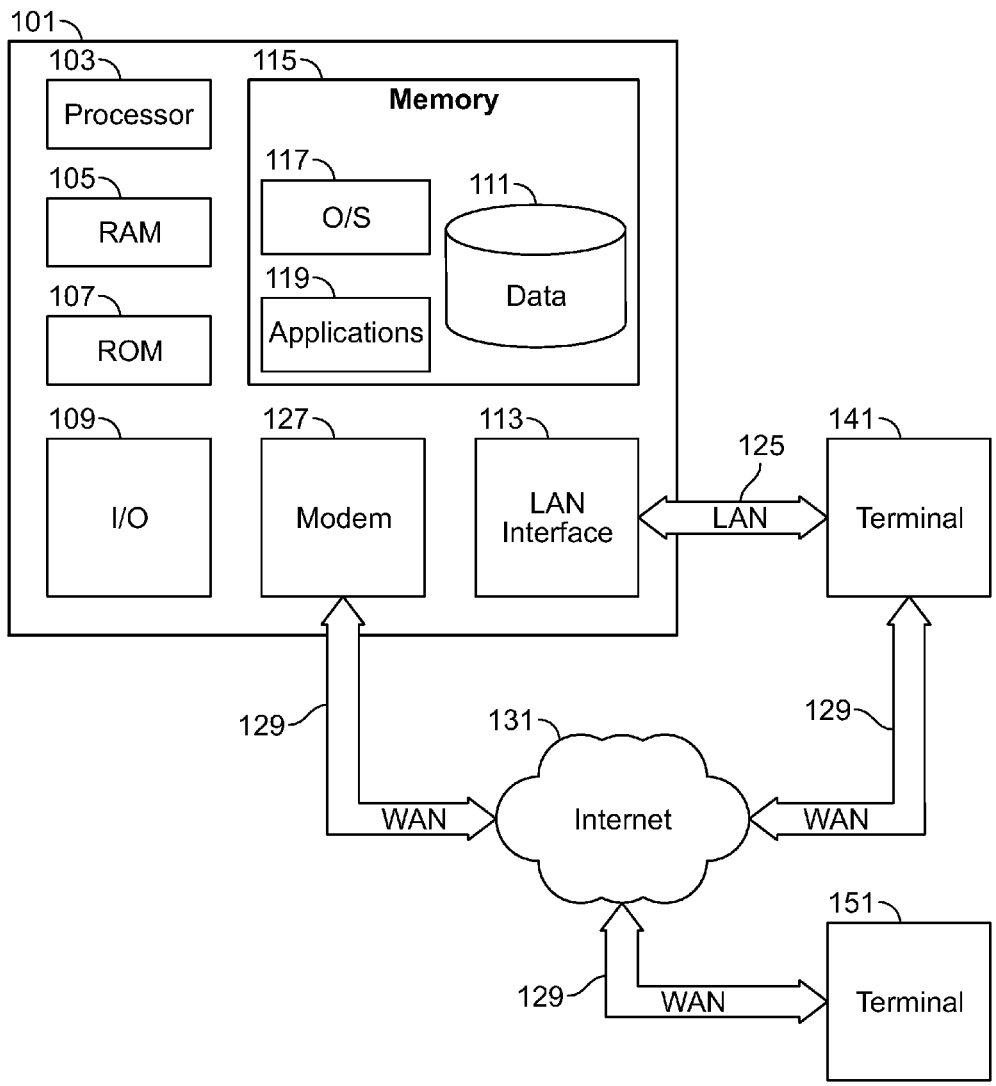
FIG. 1 shows apparatus that may be used in accordance with the principles of the invention.

Apparatus and methods for improving management of self-service devices such as Automatic Teller Machines ("ATMs"), cash recyclers, and self-service kiosks are provided. Management of these devices typically involves functions such as inventory collection, configuration control (hardware, software and firmware—i.e., a hardware device and/or computer instructions and data that reside as read-only software on that device), self-healing, remote fault diagnosis, remote fix capabilities, remote assist, software distribution and reporting.

An ATM for use with apparatus and methods according to the invention may be made up of one or more of the following devices or other suitable devices: a CPU (which may control user interface mechanisms, transaction devices, and communication with a central server), a magnetic card reader (to identify the card being used), a PIN pad, a cryptoprocessor, a display, function keys (usually in close proximity to the display) and/or a touchscreen, a printer (to provide a transaction record to a customer), a vault (to store portions of the machinery requiring restricted access), and a housing. In certain ATMs, a smart card reader (that reads a chip instead of a magnetic strip) and bill validation technology may also be implemented.

Many ATMs have migrated from a custom hardware architecture to a hardware architecture that is similar to a personal computer. Accordingly, many ATMs are able to use operating systems such as those available under the trademarks WINDOWS (from the MicroSoft Corporation, Redmond, Wash.) or LINUX (from sources such as Linux Online, Inc., Ogdensburg, N.Y.).

A further feature of an ATM for use with systems and methods according to the invention may include printing each transaction to a roll paper journal that is stored inside the ATM. The roll paper journal allows both the users of the ATMs and the financial institution associated with the ATM to settle disputes based on the records in the journal. In some cases, transactions are posted to an electronic journal. An electronic journal (referred to herein in the alternative, as an "electronic log") may remove the cost of supplying paper to the ATM and allow for electronic searching of data.

Table 1 lists illustrative types of management functions that may be performed in connection with the apparatus and methods according to the invention along with an illustrative description of each function. In some embodiments, the apparatus and methods may perform one or more of the management functions and/or other suitable functions.

TABLE 1

Illustrative types of management functions.

| Management Function | Illustrative Description |
| --- | --- |
| Proactive Maintenance | Take preventive action on a potential device failure. |
| Remote Assist | Provide to a technician fault-specific information prior to a site visit. |
| Remote Diagnostics | Remotely perform root cause analysis. |
| Remote Fix | Resolve problems without onsite presence. |
| Reporting | Report historical information and see a defined set of data elements. |
| Hardware/Software Firmware Visibility | Access and view version information regarding self-service device components, information regarding device capabilities. |
| Configuration Management | Set up defined configuration profiles and issue an alert when a device is outside of control parameters. |
| Portal | Present information from diverse sources in a unified way. Individual users may set up customized views based on their individual needs. |

TABLE 1-continued

Illustrative types of management functions.

| Management Function | Illustrative Description |
| --- | --- |
| Dashboards | Present, preferably in real time, information from diverse sources in a unified way. |

The apparatus and methods may be scalable, for example, to cover all or a portion of the fleet of ATMs that run on a platform such as that available under the trademark APTRA platform, which is available from the NCR Corporation, Dayton, Ohio.

Illustrative features of proactive maintenance, remote assistance, remote diagnostics, remote fix, reporting and views, root cause analysis and networking, security and redundancy, and other features are described below.

Proactive Maintenance

Apparatus and methods of the invention may provide a mechanism for monitoring self-service devices to predict a failure before the failure occurs. Such a mechanism may predict failure at least by providing entries in log files.

Over time, the performance of each component within a self-service terminal may degrade. As the performance degrades, warning messages may be written to log files within the device. Certain thresholds and/or patterns of these warning messages indicate that a failure is going to occur in the near future.

Performance is also measured through success rates of each device and failure prediction can take place once the performance gets below a certain threshold.

In some embodiments, the failure prediction can take place either at the self-service terminal or at the central monitoring server. A combination of the self-service terminal or the central monitoring server may be used in apparatus and methods according to the invention. In such apparatus and methods, a software and/or hardware agent residing on each self-service terminal can review the data from the device for patterns and can predict failures. The central monitoring system also looks for patterns and may predict a failure. The following are illustrative examples of features that may be present in some embodiments: Self-service Terminal Agent Prediction—makes decisions at the terminal without using network bandwidth and uses the processing power of the local device to evaluate log file patterns. Central Monitoring Server Prediction—provides a mechanism for rules to be centrally managed. Changes to rules do not have to be downloaded to each self-service terminal.

The apparatus and methods may provide the ability to gather all inventory components of a self-service device including hardware, software, drivers and firmware. In some embodiments, a software manifest (or "thumbprint") may be retrieved. The thumbprint may be a numerical value corresponding to the software present on one or more devices in the self-service device.

This inventory can be performed through a combination of Windows Management Interface (the infrastructure for management data and operations on Windows-based operating systems) and vendor specific information.

The apparatus and methods may gather information from self-service devices via an electronic communication network by polling Windows XP™ self-service device objects and peripherals. The polling may be automatic or manual, as appropriate. The polling may identify faults in the objects and/or peripherals. For the purposes of this application, a device object may be understood to represent a logical, virtual, or physical device for which a driver handles I/O (input/output) requests. Also, for the purposes of this application, a device object structure may be understood to represent a software structure that can be used by an operating system to represent a device object.

The apparatus and methods may gather information, remotely execute self-service device processes and dispatch service instructions using any suitable communication protocol, such as Gasper Exchange ("Gasper"), manufactured by Gasper, located in Dayton, Ohio. The service instructions may be directed to self-healing processes on board self-service devices. The service instruction may be directed to a human service provider. Some embodiments may include a real time (or near real time) information feed to monitor self-service devices.

The apparatus and methods may perform analysis on information gathered from the self-service devices. For example, the information may include fault information, cash inventory and dispensing information, network information and transaction information. The information may be used to identify behaviors, which may include trends.

The apparatus and methods may be used to establish self-service device performance control data, control limits, operational index thresholds and the like. The apparatus and methods may identify and act on exceptions and variations in the control data, limits and thresholds. In some embodiments, one or more limits and/or thresholds may be automatically set.

Control data may be selected such that an excursion of control data beyond control limits may be caused by a self-service device fault condition or a speculative or impending fault condition. In some embodiments, control data schema, control limits, thresholds and the like may be continuously, periodically, occasionally, or ad hoc updated at least in part in response to new data generated by the self-service device. Some embodiments may include an electronic platform for the capture of technician feedback. The feedback may provide knowledge that can be used to update control data schema, control limits and/or thresholds.

The apparatus and methods may use historical self-service device failure sequences as a basis for predicting when failure is imminent. For example, the apparatus and methods may determine when an ATM took 30 seconds to dispense 100 dollars worth of bills to a customer. Following such a determination, a machine learning algorithm can log such degraded performance prior to an actual operational failure. When a threshold number of such degraded performance events occurs, a message can be generated that informs of a potential fault situation.

The apparatus and methods may include a software and/or hardware agent that resides on the self-service device that monitors the status, availability and health of the individual device as part of or independent from a fault notification system. Such monitoring may monitor hardware, software and/or firmware—i.e., some elements include software and/or hardware. The agent may detect and report anomalous scenarios at the machine that do not cause an operational failure. Such scenarios may include where an ATM will not dispense a $5 bill. Accordingly, such scenarios may automatically generate a notification.

Another example relates to magnetic ink character recognition ("MICR"). In a scenario where a MICR-head for reading MICR ink on checks has degraded, or needs to be cleaned, repeated faults related to reading checks may occur. Such faults may precede an operational failure. Nevertheless, when such faults reach a predetermined number, the agent may report the occurrence of such pre-failure faults to the central system which may create a ticket that requests maintenance. This information may then be provided to the technician as part of the dispatch. Such a scenario may be referred to as a "Remote Assist" scenario.

Another example relates to a jammed cash acceptor. In a scenario in which a note was jammed in the cash acceptor, an alert may be sent to a central server. The alert may initiate remote maintenance. Such remote maintenance may avoid the occurrence of an operational failure that closes the machine for some amount of time and that requires more costly and time-consuming on-site maintenance by a technician.

In some embodiments, the apparatus and methods may identify "failure breakpoint" and create failure tickets that are specific to a failure root cause. For example, if a network is down and impacting 3000 self-service devices, the network outage may be identified and a fault ticket created. In some embodiments, the fault ticket may be a single fault ticket—thus avoiding redundant fault ticket creation by the other 2,999 self-service devices.

In the foregoing example, the apparatus and methods may utilize data elements that exist on each self-service device that specify the router associated with the self-service device. Based on such data, additional logic may be implemented that may allow a system to screen for mass outages. Such screening for mass outages can be used to instruct a central system either to disregard fault tickets generated by self-service devices associated with the downed router, and/or instruct the self-service devices associated with the downed router not to generate individual fault tickets. Alternatively, such screening for mass outages can be used to instruct a central system either to disregard fault tickets generated by a server associated with the downed router (or associated with ATMs associated with the downed router), and/or instruct the server not to generate selected fault tickets corresponding to the downed ATMs. Accordingly, such a system may limit the number of fault tickets generated by the self-service devices.

Apparatus and methods according to the invention may be able to provide information for each self-service device for the time and type of the last known successful transaction. Such information may be provided using agent-based technology that performs log parsing for filtering an electronic log stored by the ATM. Successful transactions are typically marked on certain electronic ATM logs. Component identification information for self-service device components, whether compatible with norms of the European Committee for Standardization ("CEN") or not, may be provided to a component supplier, such as a technician, when the supplier is dispatched.

In certain embodiments of the invention, the dispatch ticket is not closed unless all components are healthy. If the status of the device changes, an update may be sent to the vendor—i.e., when a dispatch event is created, preferably information regarding each component's health is sent to the vendor. Such an embodiment preferably reduces additional tickets for different faults because it sends a compilation of all faults that have been reported by the agent following the last dispatch event. Accordingly, all new faults may be included in a single dispatch ticket.

In some embodiments, the apparatus and methods may provide information about when the technician dispatch to provide service occurred—i.e., a time stamp of technician dispatch. The information may be compatible with one or more known service providers, such as NCR, Diebold, and Wincor.

The apparatus and methods may provide the capability to query fault ticket history for each self-service device. The fault history may include some or all of the data for each ticket. In some embodiments, the data may be maintained as historical data for 13 months or more. The historical data may be provided in a browser compatible format and may have readily-accessible links.

In some embodiments, the apparatus and methods may provide a chronological list of faults for a minimum of 7 days.

In some embodiments, the apparatus and methods may provide a platform to gather current and historical forensics on a particular error code or fault scenario. Such a platform may be implemented using log parsing, time series analysis, statistical correlation and any other suitable methods.

In some embodiments, the apparatus and methods may provide a capability for the monitoring system to interface with the software distribution system. Such technology may include agent-based technology that provides software configuration control management capabilities to automatically interface with the software distribution system.

In some embodiments, the apparatus and methods may provide near real time data on utilization of PC system resources. While self-service devices may currently provide device hardware failure information, nevertheless, self-service devices according to the invention may include reporting capabilities extending to PC system resources such as hard drive errors, memory errors, or sub-optimal processor performance.

In some embodiments, the apparatus and methods may monitor and evaluate degraded ATMs at the component level. Such components may include components that are required for the successful operation of the ATM. Such monitoring may include reviewing degradation of a cards received/cards rejected ratio or a review of the transaction success rate of the component.

In some embodiments, the apparatus and methods may automatically run defined PC-maintenance operations, such as, for example, a scheduled weekly defragmentation run or other suitably scheduled tools.

Remote Assistance

The apparatus and methods may provide fault event background information to a technician that is dispatched to service a self-service terminal. The background information may provide the technician with information that the technician may need for repairing the terminal prior to the technician's travel to the terminal site. This information can be forwarded preferably automatically by the self-service terminal and can be appended with information gathered by a remote user. Such information may have been gathered in response to remote troubleshooting. The information may be support a determination as to the root cause of a failure, fault or fault event. The information may help establish—perhaps before the technician arrives at the terminal—an association between the root cause and an inventory part.

To ensure the right part is acquired by the technician prior to going onsite, it may be helpful for the technician to know the model and revision of the relevant part or parts in the self-service device. Apparatus and methods according to the invention may be configured to report some or all inventory components of the self-service device including revision number and firmware version identification.

Remote assistance may increase availability of self-service terminals to customers. More particularly, these embodiments may reduce travel time associated with obtaining parts. Quantitatively, this troubleshooting may reduce, in some instances, the self-service terminal downtime by the amount of time it would take the technician to leave the site and return with the required replacement part.

Specifically, apparatus and methods according to the invention may append fault data with information gained through remote troubleshooting. Furthermore, providing the onsite technician with additional information prior to traveling to the site prevents additional downtime caused by the technician needing to leave the site to obtain parts after onsite troubleshooting. Onsite troubleshooting time may also be reduced by remote troubleshooting independent of whether additional parts are needed or not.

In some embodiments, a reporting module may provide a plain-language description of the fault. The host (preferably obtained from the self-service device user interface that technicians use to troubleshoot self-service devices) may interpret fault codes. (Ex: fault code "ABCDEFG" may be translated as "Card reader is out of service" and transmitted with both the fault code and the translation.)

The apparatus and methods may involve an electronic platform for an associate to share knowledge with a technician via vendor dispatch systems. The knowledge may be knowledge that the remote associate acquired during remote monitoring, diagnosis and remediation. The knowledge may be knowledge that the technician acquired from the self-service device. The knowledge may be knowledge that the remote associate, technician or other individual or entity gathered from a problem solution database.

The knowledge may include relevant fault information, such as a part number of a failed part. The knowledge may transmit inter alia, historical information—e.g., status logs which may include error information and any dispatched calls to the machine—to the remote associate. One such log for transmission to the remote associate may include a BNA binary log which contains the performance information of the BNA. The BNA may allow an associate to determine a root cause of a fault. Such a root cause may include a determination that a bill was stuck in the reject tray. Another root cause of a fault may include that the bills are stuck in the input area.

The apparatus and methods may identify what transactions of the self-service device are still operational given a device fault notification. This information may be derived at the self-service device from a "non-available function" of the device. Such a function is present in some self-service devices. It may be implemented using a grayed-out button, which indicates non-availability of the function. This information can be transmitted for sharing between the associate and the technician.

Another aspect of the present invention relates to the ability to compile some or all of the information known about a fault into a single report or group of associated reports. The report may be a fault ticket, an email message, a data object, a mark-up language file or any other suitable report. The report may be sent to the technician that will be going on site to repair the terminal. The report may include fault data from the self-service terminal, data gathered from remote troubleshooting, inventory data and historical self-service terminal data from log files which reside either at the self-service device or the central server.

Remote Diagnostics

The apparatus and methods may involve an electronic platform that allows a remote entity on the entity-side firewall to be able to take control of a self-service device remotely from a software and diagnostic perspective.

Remote control may be supported by real time (or near real time) views. The platform may export self-service device log files from self-service device systems (inclusive of Windows and non-Windows log files—e.g., application log files, security log files, electronic journal files (like the paper role associated with a cash register), trace log (which includes all communications between self-service device and host) or any other suitable log files).

Apparatus and methods for use with this present system may provide specific software, firmware and hardware inventory of each self-service device. Such inventory may include drivers.

The platform may capture and record all software, hardware and firmware changes to the self-service device. Such software, hardware and firmware may be proprietary and associated with various different entities.

The platform may capture and display the current and historic software, hardware and firmware inventory of one or more self-service devices. In some embodiments, an inventory reporting field may be overwritten. In some embodiments, the inventory information may be maintained in order to track the self-service device inventory over a period of time.

The platform may provide a report that shows a history of the software release number, including patch number, of one or more self-service devices. In this embodiment, the software release number may be logged into a field within the self-service device, and available for transmission to a remote associate.

The platform may support the execution of vendor-supplied diagnostics. Conventionally, these diagnostics are only available on-site. Such implementation may include remotely executing individual diagnostic tools relating to an individual component without requiring a full diagnosis.

In some embodiments, the platform may provide remote control such that a remote associate may execute the same software diagnosis steps that a technician would take at the device.

The platform may determine whether Voice Guidance (for seeing-impaired customers) is fully functional on Windows™-based machines. Such Voice Guidance typically provides a jack for using headphones to provide audio signals. A smart-jack that provides a signal when headphones have been inserted into the jack may be used at the self-service device. The signal or a proxy thereof may be transmitted to the platform.

The platform may communicate with a knowledge base that stores solutions for dealing with a particular fault, such as one that may have been reported in connection with a service call.

Some embodiments may include a "one button" snap shot (preferably associated with the self-service device identification number) which provides information for a checklist of faults associated with the machine.

Remote Fix

Certain aspects of the invention relate to self-healing of self-service devices. In some embodiments, the self-healing may occur regardless of what caused the failure (software, hardware or firmware.) In certain embodiments of the invention, when a fault occurs, some recovery routine(s) automatically recover the operational state of the self-service terminal. In some embodiments, the recovery may occur regardless of whether the fault was caused by hardware, software or firmware.

A self-service device according to the invention and/or a server according to the invention may store self-healing subroutines that are directed to specific fault data. Accordingly, certain aspects of the invention relate to selecting appropriate self-healing subroutines in response to the detection of a predetermined fault and/or fault profile.

Certain embodiments of the invention relating to self-healing focus on improving the availability of self-service terminals to customers. Self-recovery from faults can reduce the downtime of a self-service device by an average of 3 hours when compared to sending a technician onsite to repair the problem. Not having to send a technician on site may reduce the cost associated with maintaining a network of self-service devices.

Apparatus and methods according to the invention may provide a mechanism for a self-service terminal to heal itself without any human intervention by automatically executing recovery routine(s) when a fault occurs. The recovery routines may be initiated locally on the self-service terminal through a software agent running on the device or remotely from a central server that communicates to the software agent running on the self-service terminal. The result of an automated recovery action can be communicated to the central monitoring system. Automated recovery features may treat failures in hardware. Automated recovery features may treat failures in software. Automated recovery features may treat failures in firmware.

Some examples of self healing process steps according to the invention follow:

Software: If an event indicates that a required process has stopped, then the self-service device may restart the process.

Hardware: If an event indicates a hardware failure on the dispenser or other peripheral, the self-service device may automatically reinitialize the dispenser or other peripheral and perform a device self test to determine if the failure can be automatically recovered.

The apparatus and methods may initiate a self-healing process in a self-service device for which a fault is identified. The self-healing process may be initiated locally at the self-service device. The self-healing process may be initiated remotely. The self-healing process may include pre-defined, on-line, off-line, and/or automatically-generated steps.

Prior to a self-heal, the apparatus and methods may minimize interference with a customer transaction by delaying self-healing until the customer transaction is completed. In some embodiments, remote management functions and customer transactions may be independent such that the remote management functions do not interfere with customer transactions.

After a self-healing process is run, the success or failure of the process may be recorded. In some embodiments, the success or failure may be monitored using captured data.

In some embodiments, a self-service device screen shot may be captured for viewing in connection with remote operations. The screen shot may show what is currently displayed on a service display or a customer display. Current and historic hardware, software, and firmware inventories of the self-service device may be captured and displayed at the device or remotely.

The apparatus and methods may provide that software packages (individual file and package releases) for remote self-services fixes be housed on an internal database that is accessible for a remote fix. Thus, a copy of every file that is used on a self-service device may be housed remotely from the device so that copies can be accessed in order to troubleshoot the files resident on the device.

The apparatus and methods may involve remote execution of xfs (Extensions for Financial Services) commands, snmp (simple network management protocol) commands, service restarts and any other process requiring restart. The apparatus and methods may involve remote shut down and initialization of self-service device components.

Machine intelligence at the self-service device may be utilized to help the self-service device recover following a loss of communication. Such intelligence may also be utilized to reduce traffic on communication lines because no communication may be needed with the remote server.

In some embodiments, the apparatus and methods may return a self-service device to a last known good configuration at the component level. For example the self-service device may be restored to a previous, working version of firmware following a rollback of a later-in-time defective firmware version. This approach may apply to any driver, or executable file or any suitable version that needed to be rolled back—i.e., withdrawn from the self-service device.

In some embodiments, the apparatus and methods may involve monitoring and/or tracking user actions associated with remote access. The monitoring and/or tracking may involve associating a date and time stamp with a remote action. This may provide traceability, from a security perspective.

In some embodiments, a self-service device may be placed in an out-of-service mode. The out-of-service mode may include a supervisory mode. In the supervisory mode, the out-of-service device may display showing options for diagnosis and repair. A Gasper notification may be made when this action is performed.

Table 2 includes illustrative examples of self-service device components and processes that may be self-healed.

TABLE 2

Illustrative examples of self-service device components and processes that may be self-healed.

| Components | Processes |
| --- | --- |
| Card reader | Passport Agent |
| Printer | Touchscreen Service |
| Dispenser | Tivoli Service |
| Check acceptor | SNMP Service |
| Bill acceptor | SNMP Trap Service |
| | Print Spooler |
| | WLA - Workstation Update |
| | Domain Time Client |
| | IPSEC Service |

Reporting and Views

Increased hardware, software, and firmware visibility may also be obtained using such apparatus and methods according to the invention. For example, a system according to the invention may gather hardware inventories from self-service devices and associated hardware configuration parameters. Apparatus and methods according to the invention may also gather software inventories, associated software configuration parameters, firmware inventories from and associated firmware configuration parameters. Such apparatus and methods according to the invention may also gather driver versions from self-service devices and associated configuration parameters e.g., printer drivers, screen drivers, touchscreen drivers, etc.

Such configuration parameters, whether associated with hardware, software, or firmware, may be self-generated based on input or output data. Alternatively, such configuration parameters may be manually configured. In some embodiments, apparatus and methods according to the invention can remotely identify software manifests—i.e., a numerical identification associated with the existent software on a given self-service device.

Apparatus and methods according to the invention may monitor the health of Base24—a software application available from ACI Worldwide Corp., Omaha, Nebr. under the trademark BASE24—that runs on the server that is typically used for ATM connectivity—or any other application that runs on a server that communicates with the ATMs.

Root Cause Analysis and Networking

Many self-service devices are networked with other self-service devices. A group of networked self-service devices may be served by one or more servers. Apparatus and methods according to the invention may identify the root cause and location for a network communication breakpoint.

In order to advance such identifications and/or related investigations, certain queries may be automatically transmitted to the server or the self-service device. Such queries may include the machine-language equivalent of "do you have communication with the ATM? If not, can you communicate with the router that the ATM is routed through?"

An automated and preferably hierarchical process for determining the extent of the breakdown may also be implemented—e.g., first communication-related queries may be requested, then power supply-related queries may be requested, then processor-related queries may be requested, etc. In addition, apparatus and methods according to the invention may recall the data memory—e.g., (RAM)—dump that occurs when the self-service device locks-up or otherwise terminates operations as a result of a fault.

Apparatus and methods according to the invention may provide information on the total number of self-service devices in a network and the status of those devices. Such status reports may include status characterizations such as, for example "Unavailable", "Supervisor Mode" (out of service to customer for replenishing supplies, adding cash etc.), "Up" (communication is established with device), and "Open" (in service), etc. The apparatus and methods may work together with existing network security systems as well be adapted to use entity-supported development language (including source code) with a graphical user interface ("GUI") including a language option.

A network according to the invention may also automatically import and/or register self-service devices. This may be characterized as a self-registration process.

Security and Redundancy

In some embodiments, data transmission in connection with the apparatus and methods may conform to predetermined information security requirements, for example, those associated with protection of customer's privacy. When implemented by an entity, the apparatus and methods may be deployed substantially within the entity-side firewall network. In some embodiments, interfaces outside of the entity-side firewall may be required. Some embodiments may comply with enterprise security controls and audit standards.

Security controls may be in place to ensure that unauthorized changes to software, firmware and configuration are prevented. All information is preferably PCI-compliant (Payment Card Industry Data Security Standard), which specifies how customer data should be protected. Some embodiments may include a backup or disaster recovery processor.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information.

Any information described above in connection with database 121, and any other suitable information, may be stored in memory 125.

One or more of applications 119 may include one or more algorithms that may be used to diagnose faults, analyze data sets, parse electronic logs and/or any other suitable tasks related to end-to-end self-service device analysis.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
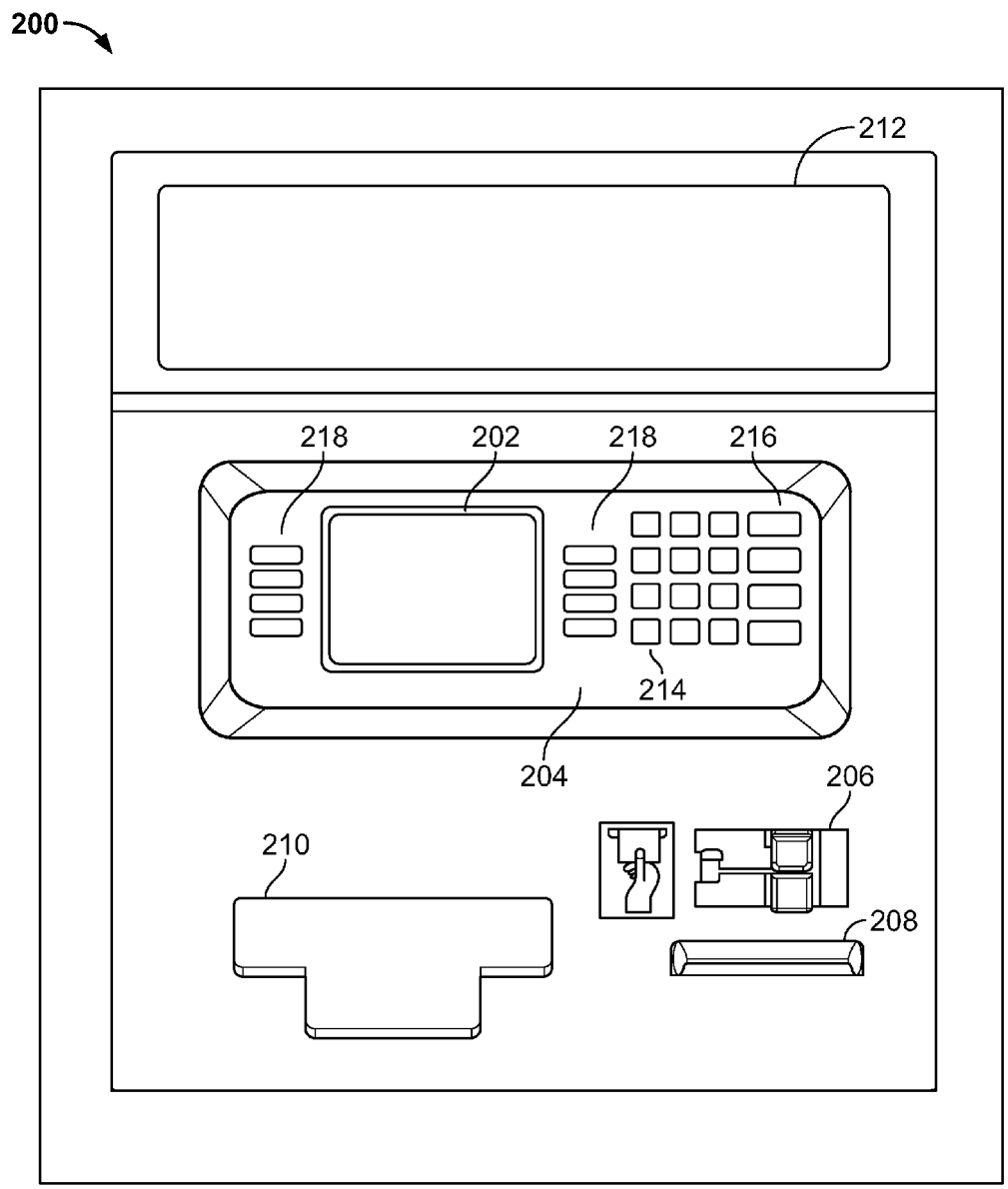
FIG. 2 shows an apparatus for use according to the principles of the invention.

FIG. 2 shows illustrative self-service device 200, which may be an ATM. Self-service device 200 may include monitor 202, keypad 204, card reader port 206, document acceptor 208, item dispenser 210 and security screen 212.

Monitor 202 may exchange visual and or audio information with a customer. Keypad 204 may include alphanumeric keys 214 for the customer to enter numerical and textual data. Keypad 204 may include control keys 216. In some embodiments, control keys 216 may be used to communicate control information, such as instructions, to self-service device 200. Keypad 204 may include soft keys. Soft keys 218 may have functions that are dictated by programming and are presented to the customer using information that may be displayed on monitor 202.

Card reader port 206 may be the front end of any suitable card reader. The card reader may read magnetically encoded information on transaction instruments such as bank cards. In some embodiments, self-service device 200 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 200 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature.

Document acceptor 208 may accept any suitable documents. For example, document acceptor 208 may accept envelopes, deposit forms, bills, checks or any other suitable documents. In some embodiments, document acceptor 208 may feed into a scanner that digitizes the documents for image-based transaction processing.

Item dispenser 210 may dispense items. For example, item dispenser 210 may dispense bills.

Security screen 212 may visually screen a surveillance device (not shown). The surveillance device may provide video information about individuals that are present near the self-service device and the conditions there.

Figure 3:
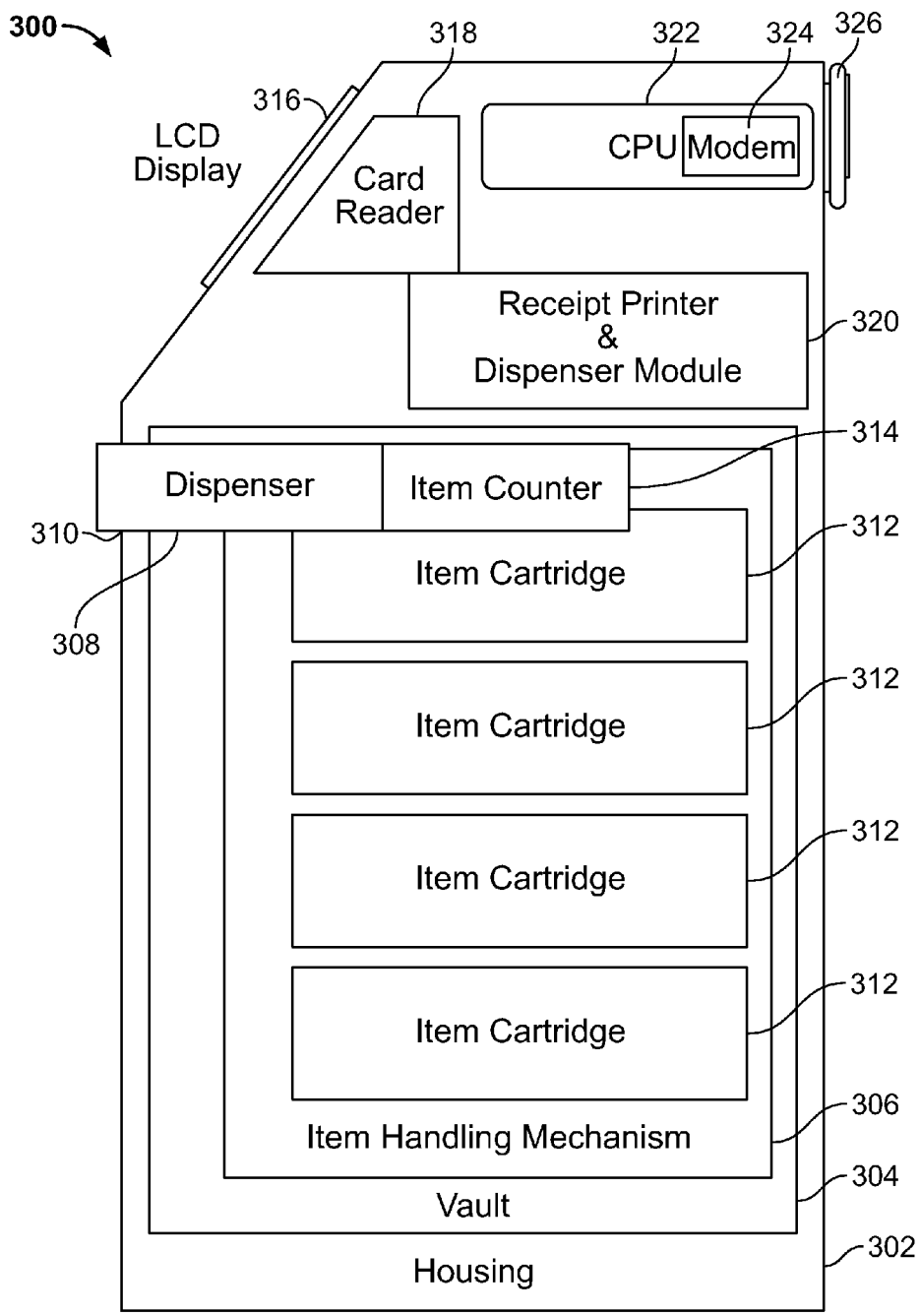
FIG. 3 shows a schematic diagram of another apparatus for use according to the principles of the invention.

FIG. 3 shows illustrative self-service device 300. Self-service device 300 may have one or more of the features of self-service device 200 (shown in FIG. 2). Self-service device 300 may include housing 302. Self-service device 300 may include vault 304. Vault 304 may contain items (not shown). Item handling mechanism 306 may be present in vault 304. Item handling mechanism 306 may store, arrange, dispense and/or otherwise handle items for dispensing from self-service device 200. For example, item handling mechanism 306 may include conveyors (not shown) for positioning and repositioning items for dispensing by dispenser 308 through item port 310. Items (not shown) in item handling mechanism 306 may be contained in item cartridges 312. For example, when the items are bills, item cartridges 312 may be cash cartridges.

Item handling mechanism 306 may include item counter 314. Item counter 314 may count items prior to dispensing by dispenser 308.

Self-service device 300 may include LCD display 316 and a keypad (not shown) for customer interaction. Card reader 318 may be present for receiving transaction information from the customer via a suitable transaction instrument. Self-service device 300 may include receipt printer and dispenser module 320. Receipt printer and dispenser module 320 may provide the customer with a record of a transaction. CPU 320 may control customer I/O, dispensing processes, which may include initialization, actuation, dispensing and any other suitable processes, receipt printing and dispensing, transaction channel communications and any other suitable processes. The transaction channel communications may be performed using modem 324, which may be any suitable communication device. Modem 324 may communicate with a local or regional network router (not shown). Service monitor 326 may be provided for a service technician to exchange information and instructions with CPU 322.

Figure 4:
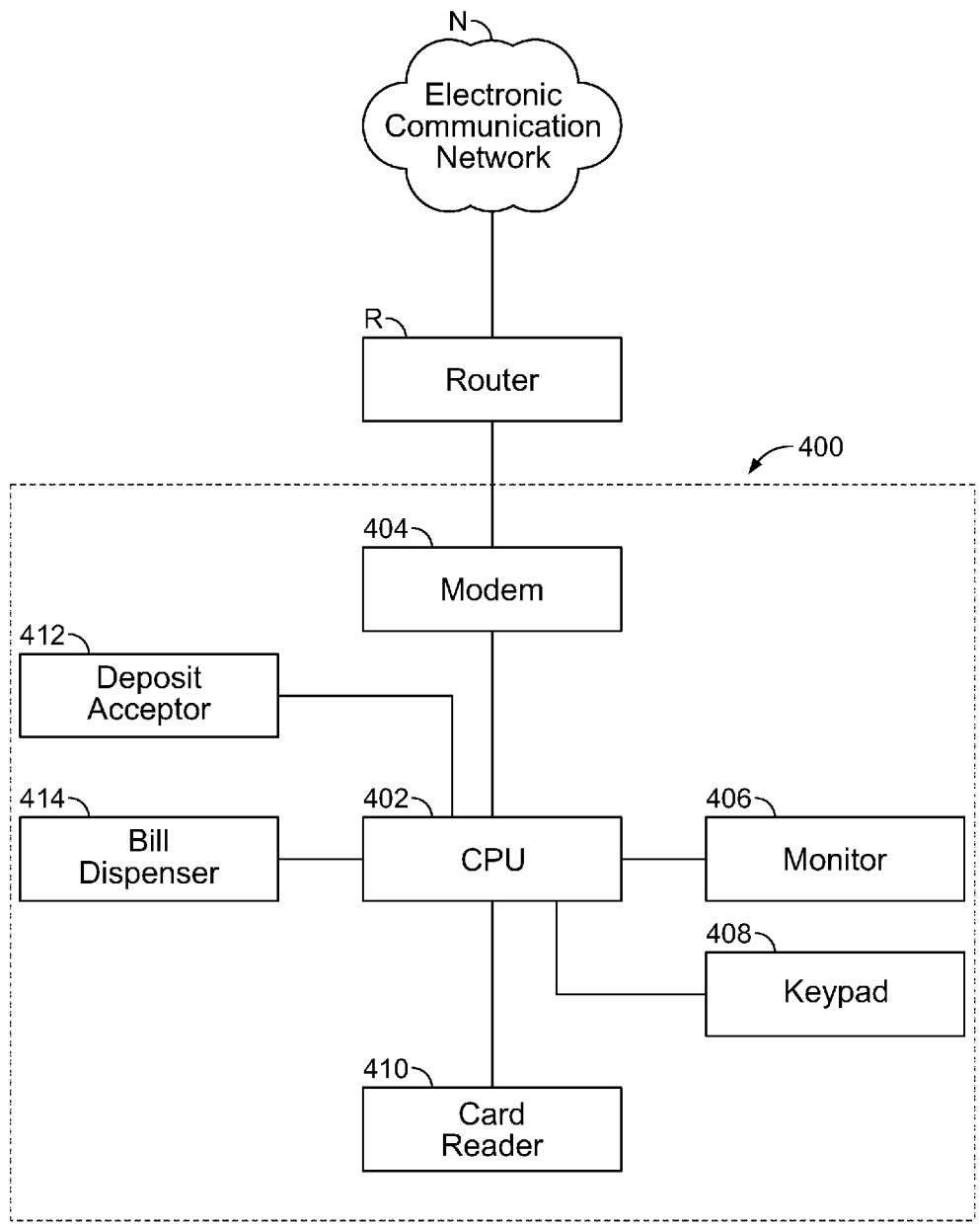
FIG. 4 shows a schematic diagram of hardware apparatus for use according to the principles of the invention.

FIG. 4 shows control system 400 for controlling a self-service device such as 300 (shown in FIG. 3). System 400 is controlled by CPU 402. CPU 402 exchanges transaction information with electronic communication network N via modem 404, which is in communication with router R. CPU 402 may receive transaction information from a customer via monitor 406, keypad 408, card reader 410 and deposit acceptor 412. CPU 402 may dispense bills through bill dispenser 414.

Figure 5:
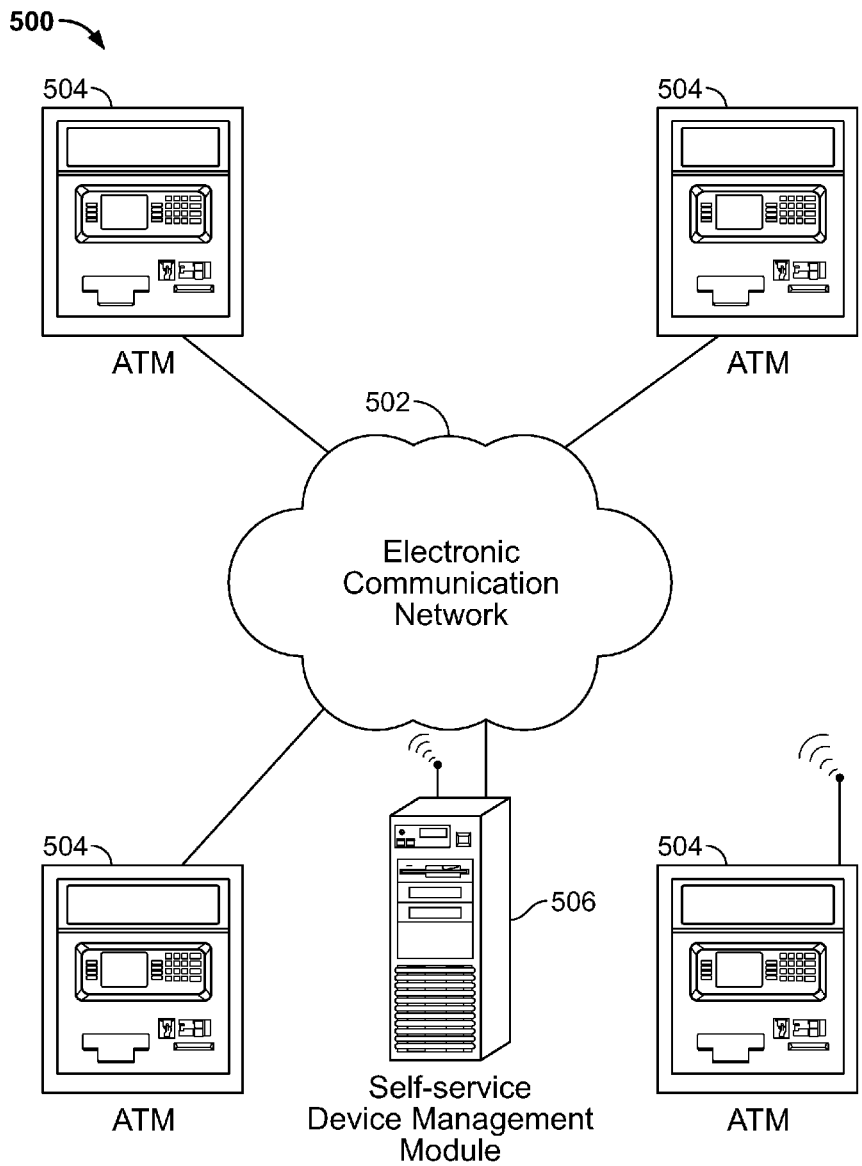
FIG. 5 shows a schematic diagram of a network for use according to the principles of the invention.

FIG. 5 shows illustrative transaction information network 500. Transaction information network 500 may include electronic communication network 502. Network 502 may be in part a LAN or WLAN, a WAN or WLAN or any other suitable network. Network 502 or portions thereof may be cabled, wired, optical fibered or wireless.

Self-service devices such as ATMs 504 may communicate via electronic communication network 502 with self-service device management module 506. Self-service device management module 506 may include one or more devices shown in FIG. 1. A remote user may use self-service device management module 506 to monitor, control, reset, repair and/or intervene in one or more processes of ATMs 504.

Figure 6:
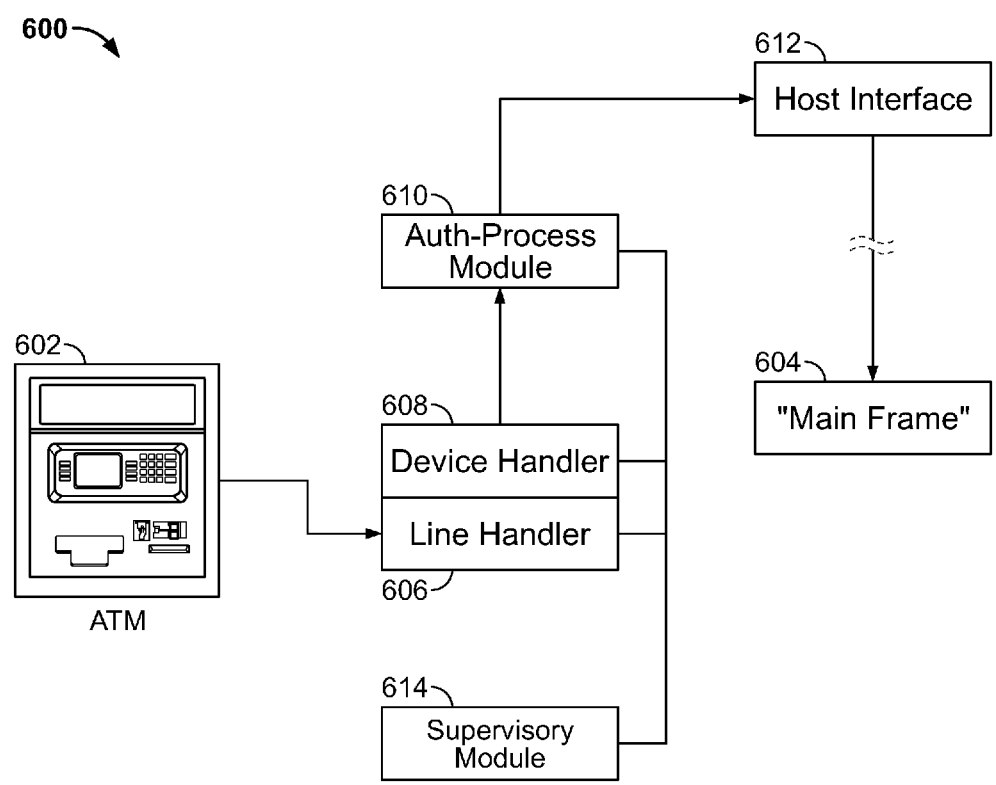
FIG. 6 shows a schematic diagram of another apparatus for use according to the principles of the invention.

FIG. 6 shows illustrative portions of communication system 600 for exchanging transaction information between ATM 602 and financial institution transactional platform 604. ATM 602 may be an ATM such as 300 (shown in FIG. 3). Transactional platform 604 may be any suitable device for settlement and clearing of transactions. For example, platform 604 may be a financial institution mainframe.

Command lines in transactional information from ATM 602 may be executed at line handler protocol layer 606. Device handler 608 may handle routing decisions based on transactional information requirements for authorization, settlement, clearance, transactional networks and issuing financial institutions. Authorization requests may then be processed by auth-process module 610. Auth-process module 610 may then provide transactional information to host interface 612 for communication with platform 604.

Supervisory module 614 may receive diagnostic data from line handler 606, device handler 608, auth-process module 610, or any other suitable source. The diagnostic data may be used to manage ATM 602. The diagnostic data may be provided to a self-service management module such as 406 (shown in FIG. 4).

Processes in accordance with the principles of the invention may include one or more features of the process illustrated in FIGS. 7-12. For the sake of illustration, the steps of the process illustrated in FIG. 7-12 will be described as being performed by a "system." The "system" may include one or more of the features of the apparatus that are shown in FIGS. 1-6 and/or any other suitable device or approach. The "system" may be provided by an entity. The entity may be an individual, an organization or any other suitable entity.

Figure 7:
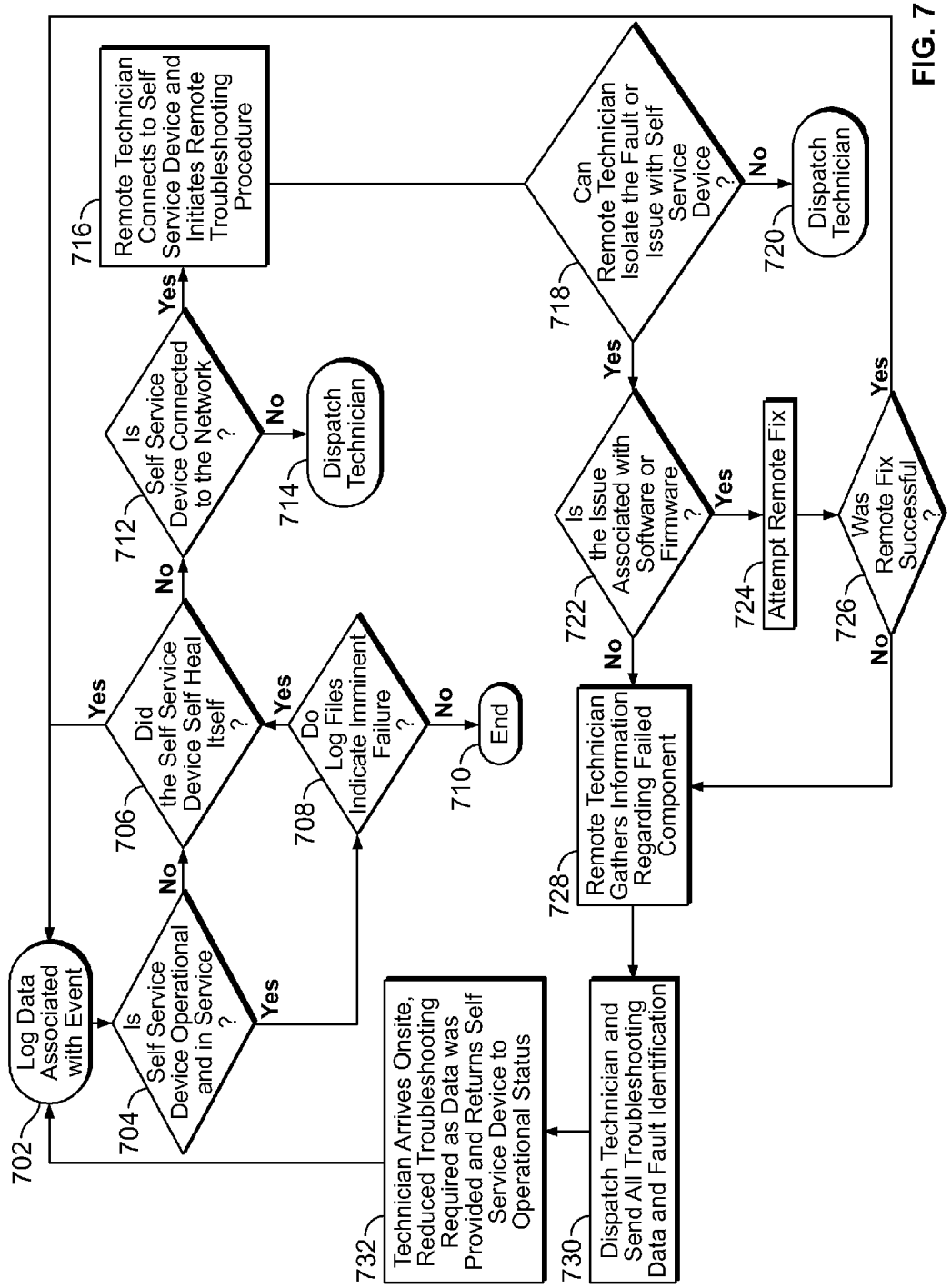
FIG. 7 shows elements of a process in accordance with the principles of the invention.

FIG. 7 shows steps of a process in accordance with the principles of the invention. Step 702 shows logging data associated with a predetermined event. In response to the predetermined event, the process may then query whether the self-service device is operational and in service, as shown in step 704.

If the self-service device is non-operational then the process may query whether the self-service device healed itself from its non-operational state, as shown at step 706.

If the self-service device is determined to be operational, then the process may further query whether log files indicate that device failure may be imminent, as shown at step 708. If failure is not imminent—i.e., device failure is not indicated—then the process may terminate at 710.

If failure is imminent, then the system may again query whether the self-service device healed itself from the imminent failure condition. If the self-service device healed itself from the imminent failure condition, then the process may loop back to step 702 to log data associated with another event.

If the self-service device did not heal itself, then the system may query whether the device (which is either non-operational or in danger of imminent failure) is connected to the network. If the device is not connected to the network, the system may generate an electronic instruction to dispatch a technician.

If the self-service device is connected to the network, then a remote technician may be electronically notified of the event, may electronically connect to the self-service device, and may initiate a remote troubleshooting procedure, as shown in step 716.

Following initiation of remote troubleshooting, the system may query whether the technician can isolate the fault or other issue with the self-service device, as shown in step 718. If the remote technician cannot isolate the fault or other issue with the self-service device, then an onsite technician may be electronically notified and dispatched, as shown in step 720.

If the remote technician can isolate the fault or other issue with the self-service device, then the system, or the technician, may query whether the fault or issue is associated with software or firmware, as shown at step 722.

Step 728 shows that, if the issue was not associated with software or firmware, then the remote technician may gather further information regarding the failed component. Following the gathering of information regarding the failed component, an onsite technician may be dispatched. Prior to the dispatch of the onsite technician, all the troubleshooting data and fault identification information may be electronically transmitted to the onsite technician, as shown in element 730.

The technician may arrive onsite preferably with a reduced troubleshooting load because of the data provided to the technician, and return the device to operational status, as shown in element 732. Thereafter, the process may loop back to element 702 following a logging of data associated with an event.

Figure 8:
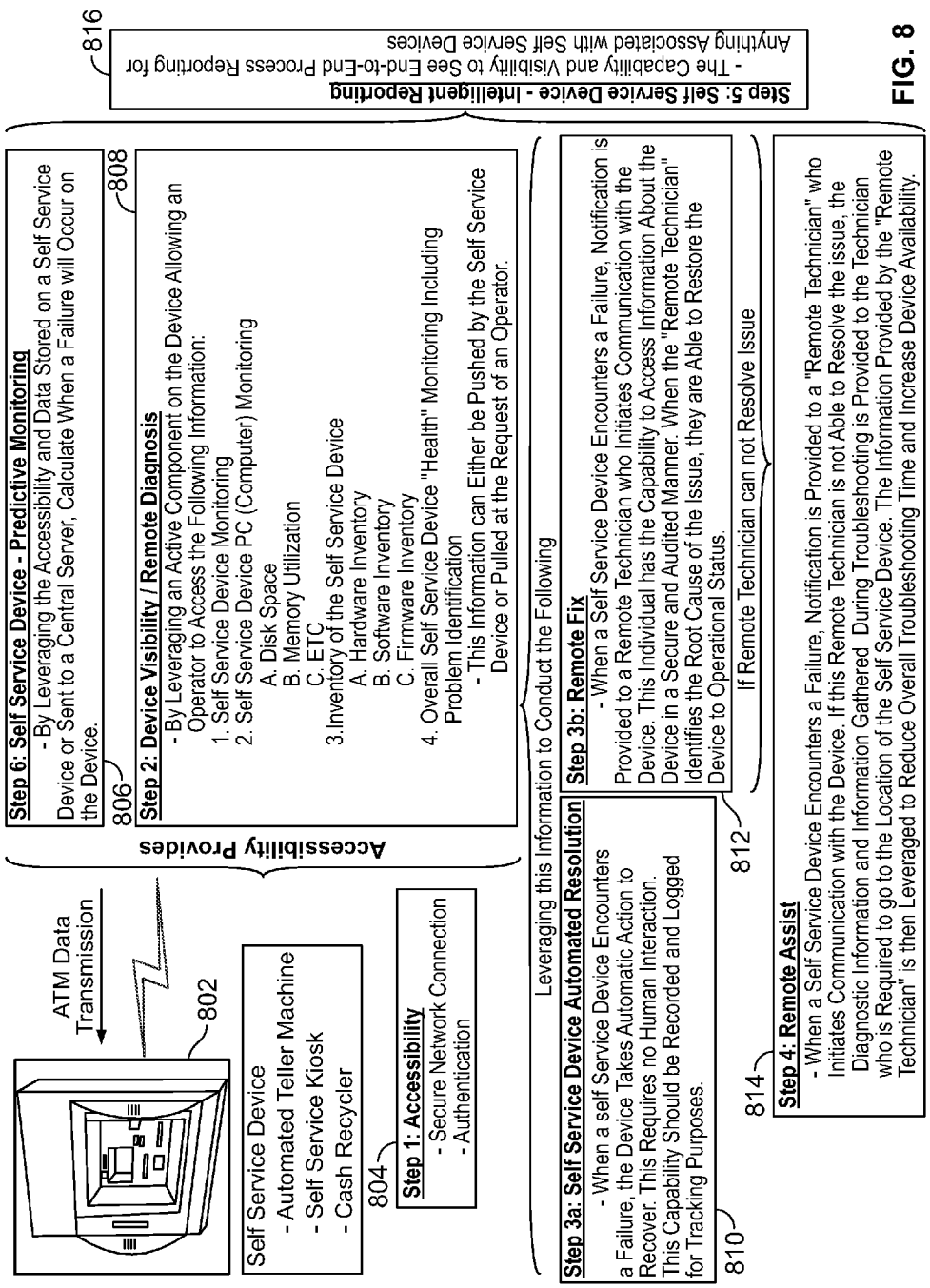
FIG. 8 shows elements of an illustrative hybrid device/process elements in accordance with the principles of the invention.

FIG. 8 shows elements of an illustrative hybrid device/process in accordance with the principles of the invention. FIG. 8 shows a self-service device 802. Self-service device may be an ATM, a self-service Kiosk, a cash recycler or another suitable self-service device (referred to collectively herein as a "self-service device").

The network accessibility 804 of device 802 preferably requires a secure network connection and further requires user authentication.

Such accessibility, together with ATM data transmission, may preferably be used to implement predictive monitoring 806 as well as remote diagnosis 808.

Predictive monitoring 806 leverages the accessibility and data stored on a self-service device, or data sent by a data device to a central server, in order to calculate when a failure is predicted to occur on the device. Failure prediction calculations occur preferably prior to the failure impacting a customer transaction, or interrupting customer transactions.

Remote diagnosis 808 preferably leverages an active component on the device, thereby allowing a remote technician to access: 1) self-service device monitoring; 2) self-service device PC (computer) monitoring (including monitoring of (a) disc space; (b) memory utilization; and/or (c) any other suitable PC characteristic); 3) inventory of the device (including (a) hardware inventory; (b) software inventory; and/or (c) firmware inventory); and/or 4) overall self-service device "health" monitoring including problem identification). Preferably, the information may be pushed by the self-service device or pulled at the request of the operator.

The information obtained from predictive monitoring 806 and remote diagnosis 808 may preferably be leveraged to provide self-service device automated resolution 810, a remote fix 812, and remote assist 814.

Self-service device automated resolution 810 may be implemented as follows. When a self-service device encounters a failure, the device may take automatic action to recover. This may require no on-site human interaction. This capability may be recorded and logged for tracking purposes.

Remote fix 812 may be implemented as follows. When a self-service encounters a failure, electronic notification may be provided to a remote technician who initiates communication with the device. This individual has the capability to access information about the device in a secure and audited manner. When the remote technician identifies the root cause of the issue, he or she is able to restore the device to operational status.

Remote assist 814 may be implemented as follows. When a self-service device encounters a failure, electronic notification may, as above with respect to remote fix 812, be provided to a remote technician. The remote technician may then initiate communication with the device. If the remote technician is not able to resolve the issue, the diagnostic information and information gathered during troubleshooting may be provided to the onsite technician who is required to go to the location of the self-service device. The information provided by the remote technician may then be leveraged to reduce overall troubleshooting time, increase device availability and reduce onsite visits.

Intelligent reporting 816 may include the capability and visibility to see end-to-end process reporting for components and processes associated with self-service devices.

Figure 9:
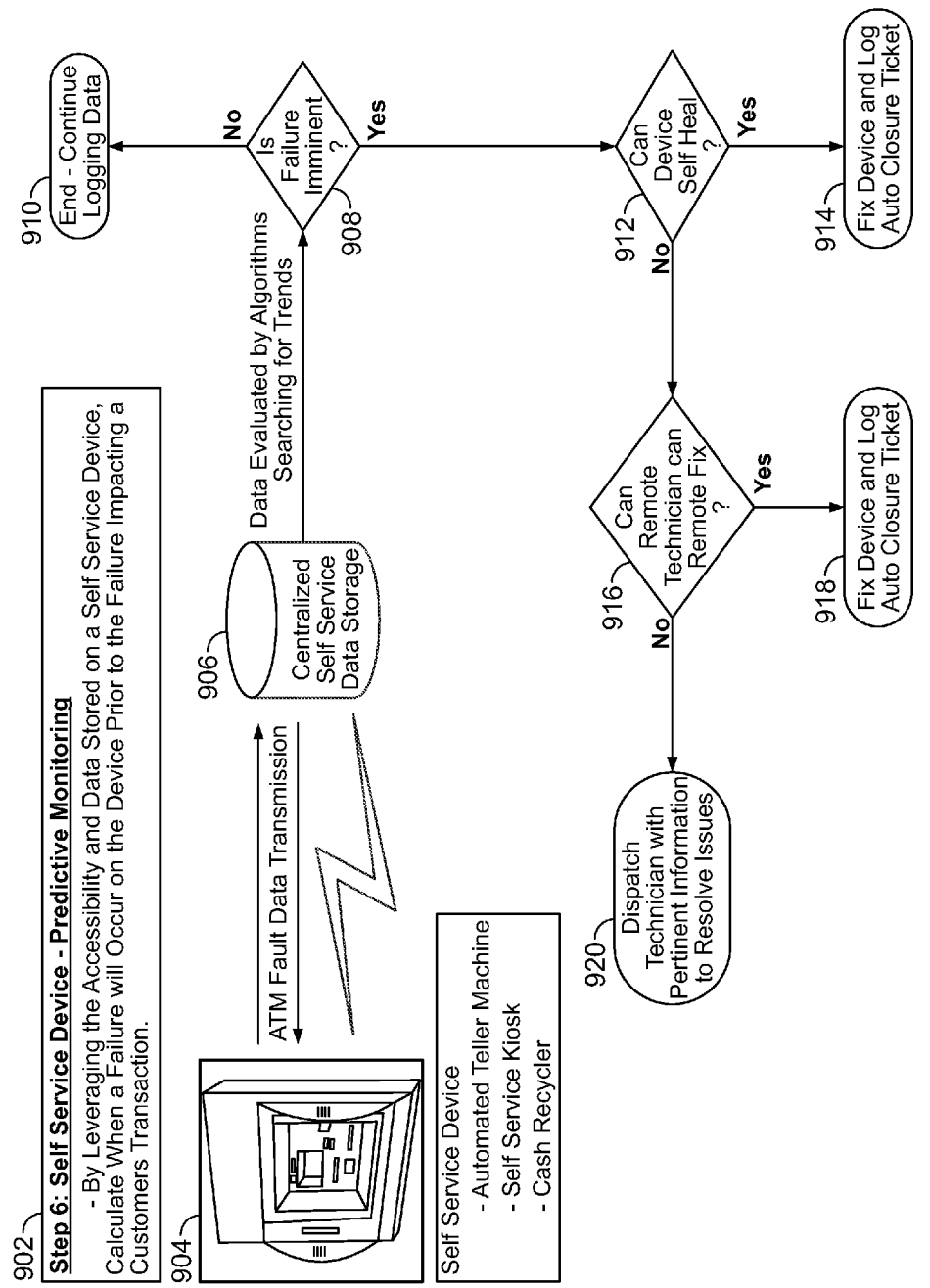
FIG. 9 shows elements of another illustrative hybrid device/process elements in accordance with the principles of the invention.

FIG. 9 shows elements of another illustrative hybrid device/process in accordance with the principles of the invention. Particularly, FIG. 9 shows predictive monitoring 902 in greater detail. An ATM 904 preferably provides a fault data transmission to centralized self-service data storage 906. The data may be evaluated by algorithms that identify trends in self-service device data. Such data may be compared to predetermined and preferably automatically generated control thresholds to determine whether a failure event is imminent, as shown at element 908. If failure is not imminent, then the process may end and logging data may continue.

If failure is indeed imminent, then the system may query whether the device can self heal, as shown at element 912. If the device can self heal, then the device is fixed and an auto closure ticket may be logged, as shown at element 914.

If the device cannot self heal then the system may query whether the remote technician can implement a remote fix, as shown at 916. If the device can be fixed remotely, then the device is fixed remotely and an auto closure ticket is logged.

If the device cannot be fixed remotely then an onsite technician is dispatched with pertinent information to resolve the issues.

Figure 10:
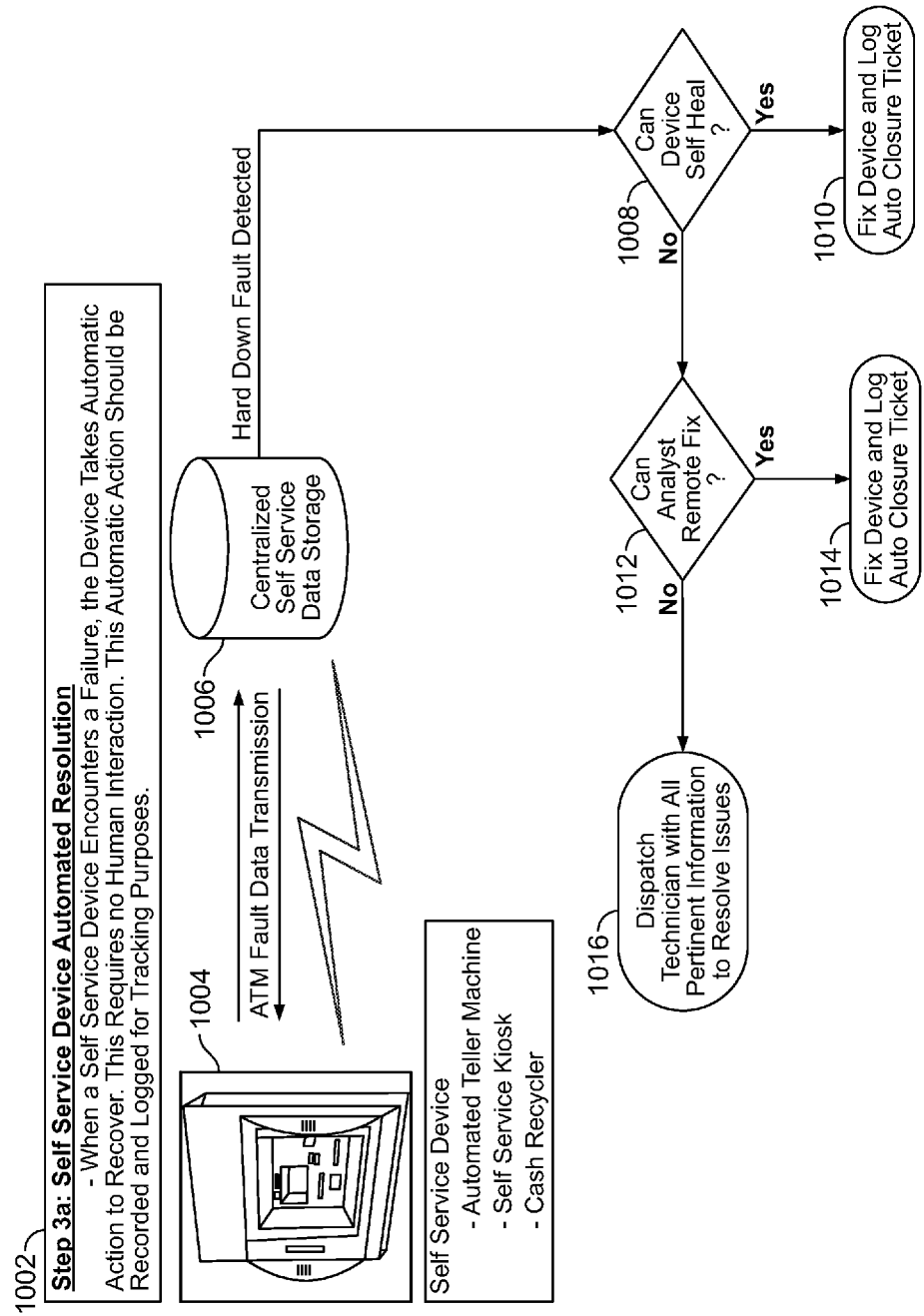
FIG. 10 shows elements of still another illustrative hybrid device/process elements in accordance with the principles of the invention.

FIG. 10 shows elements of still another illustrative hybrid device/process in accordance with the principles of the invention. FIG. 10 relates specifically to self-service device automated resolution 1002. When a self-service device according to the invention encounters a failure, the device may take automatic action to recover. This may require no human interaction. Any implementation of such automatic action may be recorded and logged for tracking purposes.

Self-service device 1004 preferably sends a transmission of fault data to centralized self-service data storage 1006. When a hard down failure is detected, the system may query whether the device can self heal, as shown at element 1008. If the device can self heal, then the device may be fixed and an auto closure ticket may be logged, as shown at element 1010.

If the device cannot self heal then the system may query whether the remote technician can implement a remote fix, as shown at 1012. If the device can be fixed remotely, then the device is fixed remotely and an auto closure ticket is logged, as shown at 1014.

If the device cannot be fixed remotely then an onsite technician is dispatched with pertinent information to resolve the issues, as shown at 1016.

Figure 11:
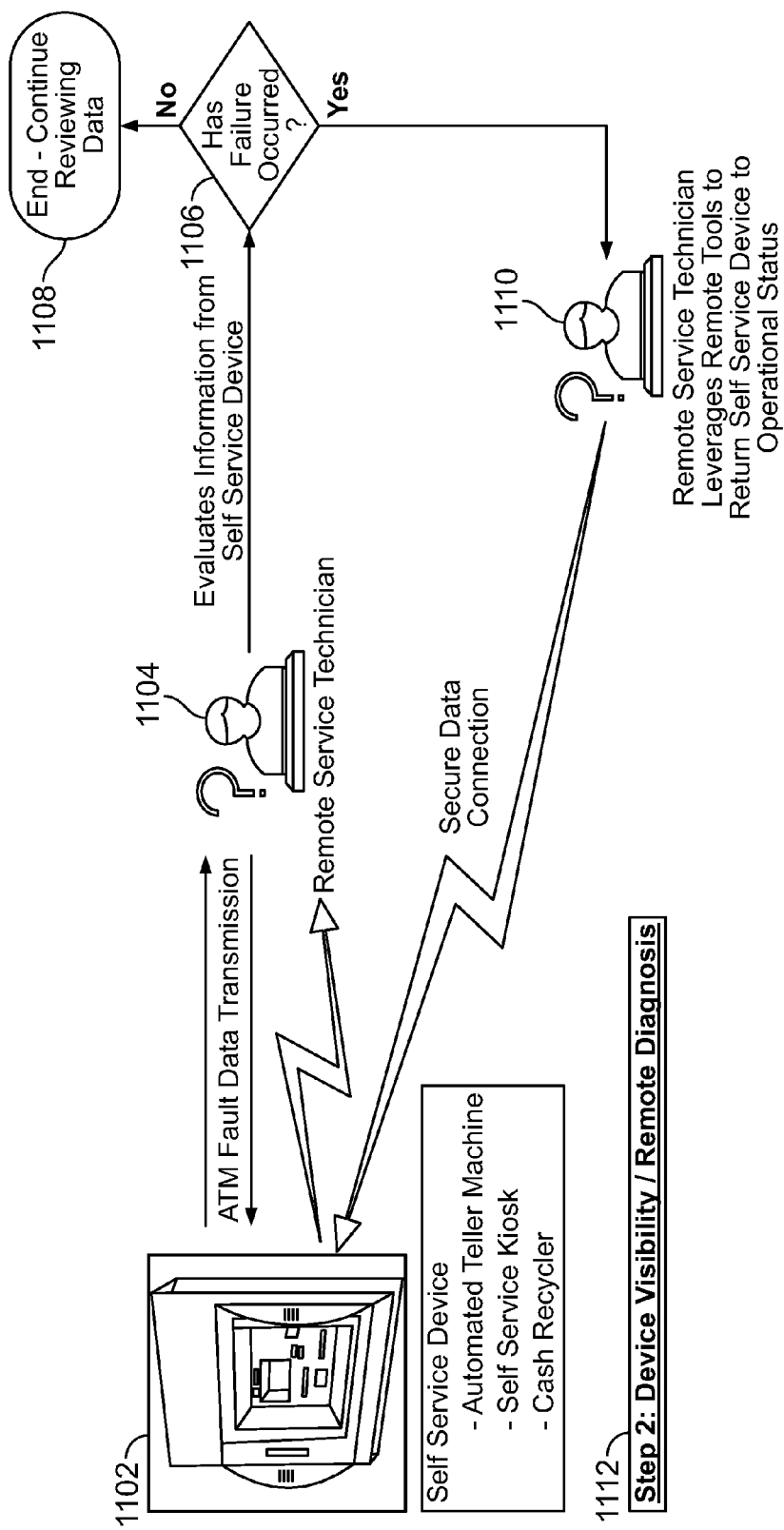
FIG. 11 shows elements of an additional illustrative hybrid device/process elements in accordance with the principles of the invention.

FIG. 11 shows elements of an additional illustrative hybrid device/process in accordance with the principles of the invention. Specifically, FIG. 11 shows a detailed flow diagram of device visibility/remote analysis 1112.

A device 1102 may transmit fault data via a remote service connection to a remote technician, shown at 1104. The remote technician may evaluate the information from the device to determine whether a fault has occurred, as shown at 1106. If no fault has occurred then the reviewing data may continue at 1108. If a fault is determined to have occurred, then the remote service technician may, via a secure connection, leverage remote tools to return the device to operational status, as shown at 1110.

Figure 12:
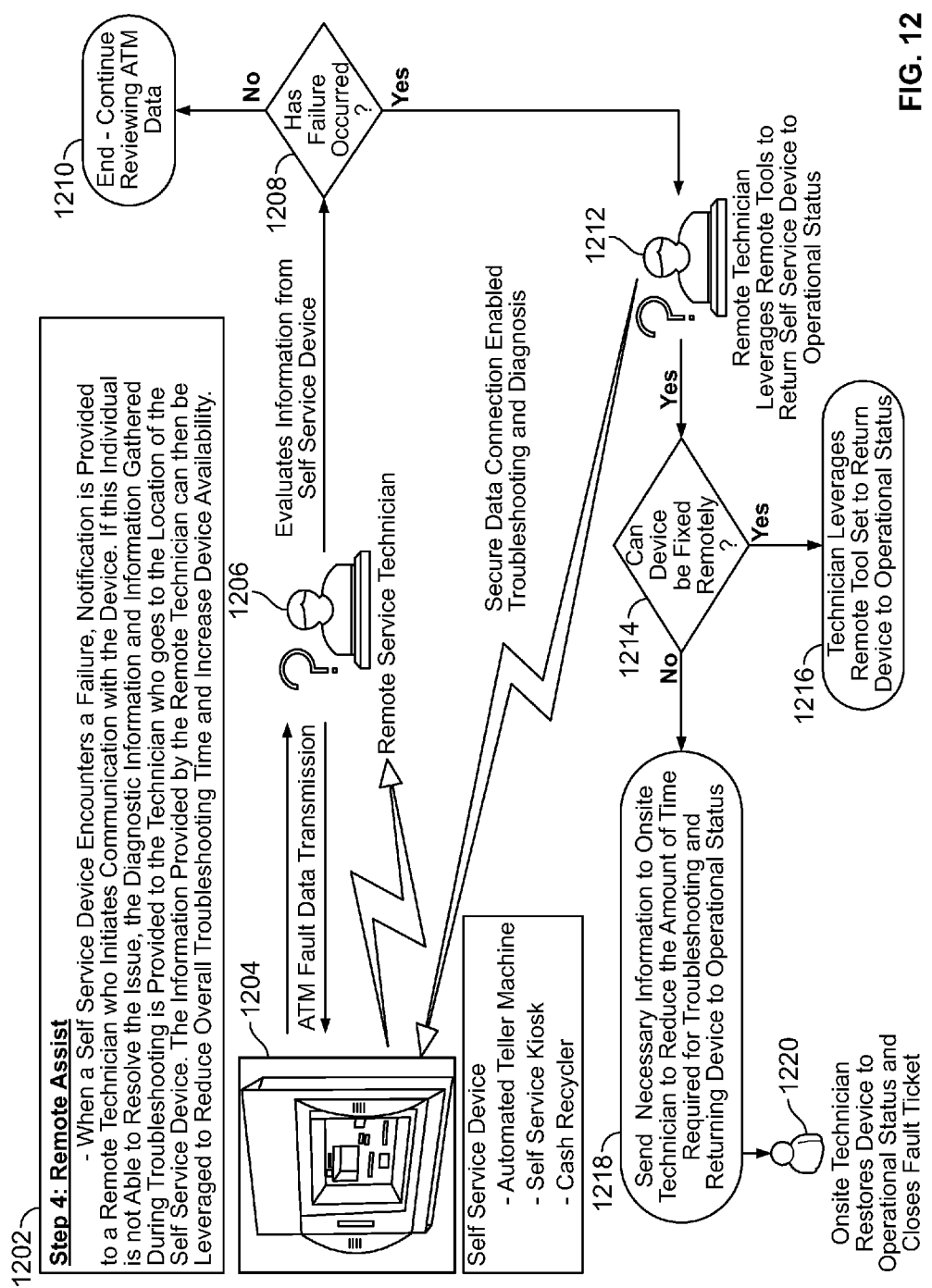
FIG. 12 shows elements of one more hybrid device/process elements in accordance with the principles of the invention.

FIG. 12 shows elements of one more hybrid device/process in accordance with the principles of the invention. FIG. 12 focuses on remote assist 1202. When a self-service device encounters a failure, notification is provided to a remote technician who initiates communication with the device. If this individual is not able to resolve the issue, the diagnostic information and information gathered during troubleshooting is provided to the onsite technician. The onsite technician may go to the location of the self-service device. The information provided by the remote technician may then be leveraged to reduce overall troubleshooting down-time and increase device availability.

The device 1204 may transmit fault data to a remote service technician 1206. The technician 1206 may evaluate information from the device and determine whether a failure has occurred, as shown at element 1208. If no failure occurred, then the process may terminate, at 1210, and review of data may continue.

If failure has occurred, then the remote technician may leverage remote tools to return device 1204 to operational status. If the device can be remotely fixed, as shown at 1214, then the technician leverages a remote tool set to return the device to operational status, as shown at 1216. If the device cannot be remotely fixed then necessary information may be sent to an onsite technician for a visit to the device. The information may reduce the amount of time required for troubleshooting and return the device to operational status, as shown at 1218. The onsite technician may then restore the device to operational status and close a fault ticket, as shown at 1220.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, a self-service terminal with mechanism(s) for making deposits and for permitting withdrawals as well as methods for managing said terminal have been provided. Persons skilled in the art will appreciate that the present invention can be practiced by other than the described embodiments, which are presented for purposes of illustration rather than of limitation. The present invention is limited only by the claims that follow.

What is claimed is:

1. A server that remotely monitors an Automated Teller Machine ("ATM"), the server comprising:
    a memory module for maintaining information including identification of software applications resident on the ATM, identification of firmware applications resident on the ATM, and identification of hardware resident on the ATM;
    the memory module further for storing an electronic file comprising a history of updates of identification of software applications resident on the ATM, updates of identification of firmware applications resident on the ATM, and updates of identification of hardware resident on the ATM;
    a communications module for receiving an update of the identification of one or more of the software applications resident on the ATM, an update of the identification of one or more of the firmware applications resident on the ATM, and/or an update of the identification of one or more of the hardware resident on the ATM;
    a processing module for storing in the memory module the one or more received updates; and
    a transmitter, the transmitter configured to, in response to the processing module identifying a fault at the ATM, transmit information to the ATM that initiates a self-healing process at the ATM, the self-healing process including restoring at least one software application and/or firmware application to a version of the at least one software application and/or a version of the at least one firmware application that was resident on the ATM prior to the receipt of the one or more updates, the version of the at least one software application and/or the version of the at least one firmware application being identified in the electronic file comprising the history of updates of the identification of the at least one software application and/or firmware application.

2. The server of claim 1 further comprising a monitoring module for monitoring the operational status of the software applications, the operational status of the firmware applications, and the operational status of the hardware.

3. The server of claim 1 wherein the memory module is further configured for maintaining information including configuration parameters associated with software applications resident on the ATM, configuration parameters associated with firmware applications resident on the ATM, and configuration parameters associated with the hardware resident on the ATM.

4. The server of claim 3, wherein the processor module is configured to send an electronic notification to a technician workstation in response to a determination that at least one of the software applications, at least one of the hardware applications and at least one of the firmware applications is operating outside of a predetermined configuration parameter.

5. The server of claim 1 further comprising a monitoring module for monitoring the operational status of a Base24 software application running on the server.

6. The server of claim 1 wherein the communications module is further configured for receiving a software manifest of a remote ATM.

7. One or more non-transitory computer-readable media storing computer-executable instructions which, when executed by a processor on a computer system, perform a method for remotely monitoring an Automated Teller Machine ("ATM"), the method comprising:
    maintaining information in a remote database, the information including:
        identification of software applications resident on the ATM, identification of firmware applications resident on the ATM, and identification of hardware resident on the ATM; and
        an electronic file comprising a history of updates of identification of software applications resident on the ATM, updates of identification of firmware applications resident on the ATM, and updates of identification of hardware resident on the ATM;

receiving an update of the identification of one or more of the software applications resident on the ATM, an update of the identification of one or more of the firmware applications resident on the ATM, and/or an update of the identification of one or more of the hardware resident on the ATM;

a processing module for storing in the remote database the one or more received updates; and a transmitter, the transmitter configured to, in response to the processing module identifying a fault at the ATM, transmit information to the ATM that initiates a self-healing process at the ATM, the self-healing process including restoring at least one software application and/or firmware application to a version of the at least one software application and/or a version of the at least one firmware application that was resident on the ATM prior to the receipt of the one or more updates, the version of the at least one software application and/or the version of the at least one firmware application being identified in the electronic file comprising the history of updates of the identification of the at least one software application and/or firmware application.

8. The method of claim 7 further comprising monitoring the operational status of the software applications, the operational status of the firmware applications, and the operational status of the hardware.

9. The method of claim 7 further comprising maintaining information including configuration parameters associated with software applications resident on the ATM, configuration parameters associated with firmware applications resident on the ATM, and configuration parameters associated with the hardware resident on the ATM.

10. The method of claim 9 further comprising transmitting an electronic notification in a response to a determination that the software is operating outside a predetermined configuration parameter.

11. The method of claim 7 further comprising monitoring the operational status of a Base24 software application running on the server.

12. The method of claim 7 further comprising receiving a software manifest of a remote ATM.

13. A method for remotely monitoring an Automated Teller Machine ("ATM"), the method comprising:

maintaining information in a remote database, the information including:

identification of software applications resident on the ATM, identification of firmware applications resident on the ATM, and identification of hardware resident on the ATM; and an electronic file comprising a history of updates of identification of software applications resident on the ATM, updates of identification of firmware applications resident on the ATM, and updates of identification of hardware resident on the ATM;

receiving an update of the identification of one or more of the software applications resident on the ATM, an update of the identification of one or more of the firmware applications resident on the ATM, and/or an update of the identification of one or more of the hardware resident on the ATM;

storing the one or more received updates; and transmitting, in response to identifying a fault at the ATM, information to the ATM that initiates a self-healing process at the ATM, the self-healing process including restoring at least one software application and/or firmware application to a version of the at least one software application and/or a version of the at least one firmware application that was resident on the ATM prior to the receipt of the one or more updates, the version of the at least one software application and/or the version of the at least one firmware application being identified in the electronic file comprising the history of updates of the identification of the at least one software application and/or firmware application.

14. The method of claim 13 further comprising monitoring the operational status of the software applications, the operational status of the firmware applications, and the operational status of the hardware.

15. The method of claim 13 further comprising maintaining information including configuration parameters associated with software applications resident on the ATM, configuration parameters associated with firmware applications resident on the ATM, and configuration parameters associated with the hardware resident on the ATM.

16. The method of claim 15 further comprising transmitting an electronic notification in a response to a determination that the software is operating outside a predetermined configuration parameter.

17. The method of claim 13 further comprising monitoring the operational status of a Base24 software application running on the server.

18. The method of claim 13 further comprising receiving a software manifest of a remote ATM.

* * * * *